(12) United States Patent
Abhyankar et al.

(10) Patent No.: US 11,625,426 B2
(45) Date of Patent: Apr. 11, 2023

(54) INCORPORATING OPINION INFORMATION WITH SEMANTIC GRAPH DATA

(71) Applicant: MicroStrategy Incorporated, Vienna, VA (US)

(72) Inventors: Saurabh Abhyankar, McLean, VA (US); Scott Rigney, Arlington, VA (US); Timothy Lang, McLean, VA (US)

(73) Assignee: MicroStrategy Incorporated, Vienna, VA (US)

( * ) Notice: Subject to any disclaimer, the term of this patent is extended or adjusted under 35 U.S.C. 154(b) by 321 days.

(21) Appl. No.: 16/450,673

(22) Filed: Jun. 24, 2019

(65) Prior Publication Data

US 2020/0250245 A1 Aug. 6, 2020

Related U.S. Application Data

(60) Provisional application No. 62/801,239, filed on Feb. 5, 2019, provisional application No. 62/801,290, filed
(Continued)

(51) Int. Cl.
| | |
|---|---|
| *G06F 16/953* | (2019.01) |
| *G06F 16/36* | (2019.01) |
| *G06T 11/20* | (2006.01) |
| *G06F 16/9535* | (2019.01) |
| *G06F 16/33* | (2019.01) |
| *G06F 16/901* | (2019.01) |

(Continued)

(52) U.S. Cl.
CPC .......... *G06F 16/36* (2019.01); *G06F 16/3344* (2019.01); *G06F 16/9024* (2019.01); *G06F 16/9027* (2019.01); *G06F 16/953* (2019.01);

*G06F 16/9535* (2019.01); *G06F 40/30* (2020.01); *G06N 5/04* (2013.01); *G06T 11/206* (2013.01); *G10L 13/027* (2013.01)

(58) Field of Classification Search
None
See application file for complete search history.

(56) References Cited

U.S. PATENT DOCUMENTS

| | | |
|---|---|---|
| 8,661,012 B1 | 2/2014 | Baker et al. |
| 8,972,467 B2 | 3/2015 | Heinrich et al. |

(Continued)

OTHER PUBLICATIONS

US Office Action in U.S. Appl. No. 16/677,183, dated Apr. 21, 2021, 21 pages.

(Continued)

*Primary Examiner* — Thu N Nguyen
(74) *Attorney, Agent, or Firm* — Fish & Richardson P.C.

(57) ABSTRACT

Methods, systems, and apparatus, including computer programs encoded on computer-readable storage media, for incorporating opinion information with semantic graph data. In some implementations, semantic graph data indicating objects relationships among the objects is stored. Opinion data indicating user sentiment with respect to the objects is generated. A particular object of the objects indicted by the semantic graph is identified. An opinion measure for the particular object is determined based on the generated opinion data. Output data is provided to a client device for presentation, where the output data is generated based on the opinion measure for the particular object.

18 Claims, 5 Drawing Sheets

Related U.S. Application Data on Feb. 5, 2019, provisional application No. 62/821,132, filed on Mar. 20, 2019.

(51) Int. Cl.
*G06F 40/30* (2020.01)
*G06N 5/04* (2023.01)
*G10L 13/027* (2013.01)

(56) References Cited

U.S. PATENT DOCUMENTS

| | | | |
|---|---|---|---|
| 9,531,829 | B1 | 12/2016 | Anand et al. |
| 10,810,371 | B2 | 10/2020 | Shinn et al. |
| 2004/0220905 | A1 | 11/2004 | Chen et al. |
| 2008/0060051 | A1 | 3/2008 | Lim |
| 2008/0244540 | A1 | 10/2008 | Feblowitz et al. |
| 2011/0313987 | A1* | 12/2011 | Ghosh ............... G06F 16/334 707/706 |
| 2011/0320187 | A1 | 12/2011 | Motik et al. |
| 2012/0158636 | A1 | 6/2012 | Bowers et al. |
| 2012/0221555 | A1 | 8/2012 | Byrne et al. |
| 2012/0221558 | A1 | 8/2012 | Byrne et al. |
| 2012/0290518 | A1 | 11/2012 | Flinn et al. |
| 2013/0036117 | A1 | 2/2013 | Fisher et al. |
| 2013/0073979 | A1 | 3/2013 | Shepherd et al. |
| 2013/0254736 | A1 | 9/2013 | Chen et al. |
| 2013/0275440 | A1* | 10/2013 | Amer-Yahia ......... G06F 16/951 707/749 |
| 2014/0200891 | A1 | 7/2014 | Henri et al. |
| 2014/0236570 | A1 | 8/2014 | Heck et al. |
| 2014/0236579 | A1 | 8/2014 | Kurz |
| 2014/0267344 | A1 | 9/2014 | Wilson et al. |
| 2015/0106078 | A1 | 4/2015 | Chang |
| 2015/0106156 | A1 | 4/2015 | Chang et al. |
| 2015/0227563 | A1 | 8/2015 | Walkingshaw et al. |
| 2015/0293954 | A1 | 10/2015 | Hsiao et al. |
| 2015/0347905 | A1* | 12/2015 | Chen .................. G06Q 50/01 706/12 |
| 2016/0048368 | A1 | 2/2016 | McGibney et al. |
| 2016/0103878 | A1 | 4/2016 | Boe et al. |
| 2016/0179864 | A1 | 6/2016 | Roberts |
| 2016/0232157 | A1 | 8/2016 | Mansour et al. |
| 2016/0267198 | A1 | 9/2016 | Lahmer et al. |
| 2016/0275204 | A1 | 9/2016 | Miranker et al. |
| 2016/0328467 | A1 | 11/2016 | Zou et al. |
| 2016/0357872 | A1* | 12/2016 | Fader .................. G06Q 10/00 |
| 2017/0024460 | A1 | 1/2017 | Mac an tSaoir et al. |
| 2017/0063889 | A1 | 3/2017 | Muddu et al. |
| 2017/0085446 | A1 | 3/2017 | Zhong et al. |
| 2017/0147635 | A1* | 5/2017 | McAteer ............. G06F 16/2246 |
| 2017/0228435 | A1 | 8/2017 | Tacchi et al. |
| 2017/0237801 | A1 | 8/2017 | Baluja et al. |
| 2017/0262520 | A1 | 9/2017 | Mitkar et al. |
| 2017/0293947 | A1* | 10/2017 | Singh ................. G06Q 30/0609 |
| 2017/0329844 | A1 | 11/2017 | Tacchi et al. |
| 2017/0372204 | A1 | 12/2017 | Sweeney et al. |
| 2018/0039854 | A1* | 2/2018 | Wren ................. G06F 3/04842 |
| 2018/0069887 | A1 | 3/2018 | Chauhan et al. |
| 2018/0089281 | A1 | 3/2018 | Li et al. |
| 2018/0089328 | A1 | 3/2018 | Bath et al. |
| 2018/0181667 | A1 | 6/2018 | Kolb et al. |
| 2018/0189388 | A1 | 7/2018 | Soares et al. |
| 2018/0189389 | A1 | 7/2018 | Soares et al. |
| 2018/0196831 | A1 | 7/2018 | Maybee et al. |
| 2018/0241660 | A1 | 8/2018 | Fletchet et al. |
| 2018/0246942 | A1 | 8/2018 | Chen et al. |
| 2018/0253676 | A1 | 9/2018 | Sheth et al. |
| 2018/0268253 | A1 | 9/2018 | Hoffman et al. |
| 2018/0307744 | A1 | 10/2018 | Gadekar et al. |
| 2018/0365309 | A1 | 12/2018 | Oliner et al. |
| 2019/0005025 | A1 | 1/2019 | Malabarba |
| 2019/0108274 | A1 | 4/2019 | DaBoll-Lavoie et al. |
| 2019/0220471 | A1 | 7/2019 | Toledo et al. |
| 2019/0250998 | A1 | 8/2019 | Bedadala et al. |
| 2019/0339950 | A1 | 11/2019 | Meyer et al. |
| 2020/0226156 | A1 | 7/2020 | Borra et al. |
| 2020/0250217 | A1 | 8/2020 | Abhyankar et al. |
| 2020/0250230 | A1 | 8/2020 | Abhyankar et al. |
| 2020/0250235 | A1 | 8/2020 | Abhyankar et al. |
| 2020/0252281 | A1 | 8/2020 | Abhyankar et al. |
| 2020/0301953 | A1 | 9/2020 | Abhyankar et al. |
| 2020/0410514 | A1 | 12/2020 | Livhits et al. |

OTHER PUBLICATIONS

US Office Action in U.S. Appl. No. 16/677,183, dated Nov. 4, 2020, 17 pages.

cio.com [online], "Why your BI strategy needs a universal semantic data layer," Nov. 10, 2017, retrieved on Feb. 27, 2020, retrieved from URL <https://www.cio.com/article/3236566/why-your-bi-strategy-needs-a-universal-semantic -data-layer.html>, 6 pages.

datanami.com [online], "Why Enterprise Knowledge Graphs Need Semantics," Oct. 2, 2017, retrieved on Feb. 27, 2020, retrieved from URL <https://www.datanami.com/2017/10/02/enterprise-knowledge-graphs-need-semantics/>, 3 pages.

ir.microstrategy.com [online], "MicroStrategy Offers a Better Long-Term Solution for Enterprises Caught in Analytics Industry Upheaval," Jan. 11, 2019, retrieved on Feb. 27, 2020, retrieved from URL <https://ir.microstrategy.com/news-releases/news-release-details/microstrategy-offers-better-long-term-solution-enterprises>, 5 pages.

microstrategy.com [online], "2020 Enterprise Analytics Trends: The Semantic Graph Becomes Paramount to Delivering Business Value," Dec. 12, 2019, retrieved on Feb. 27, 2020, retrieved from URL <https://www.microstrategy.com/us/resources/blog/bi-trends/2020-enterprise-analytics-trends-the-semantic-graph-becomes-paramount-to-delivering-business-value>, 7 pages.

microstrategy.com [online], "A Semantic Graph Unlocks HyperIntelligence," Nov. 20, 2019, retrieved, on Feb. 27, 2020, retrieved from URL <https://www.microstrategy.com/us/resources/blog/bi-trends/a-semantic-graph-unlocks-hyperintelligence>, 9 pages.

microstrategy.com [online], "MicroStrategy 2019: Built for Breakthroughs," Jan. 7, 2019, retrieved on Feb. 27, 2020, retrieved from URL <https://www.microstrategy.com/us/resources/blog/news-and-events/microstrategy-2019-built-for-breakthroughs, 8 pages.

microstrategy.com [online], "The Enterprise Semantic Graph" Feb. 13, 2019, retrieved on Feb. 27, 2020, retrieved from URL <https://www.microstrategy.com/getmedia/a6ad9b4a-a0fe-4247-8ae5-477c0efb4458/Published-World-2019-Enterprise-Semantic-Graph>, 21 pages.

microstrategy.com [online], "The Enterprise Semantic Graph: Laying the Foundation for Revolutionary Applications," Jan. 15, 2019, retrieved on Feb. 27, 2020, retrieved from URL <https://www.microstrategy.com/us/resources/blog/bi-trends/the-enterprise-semantic-graph-laying-the-foundation-for-revolutionary-applications>, 7 pages.

prnewswire.com [online], "MicroStrategy 2019, the World's Most Advanced Analytics & Mobility Platform, Powers Decisions for Every Moment of the Day," Jan. 10, 2019, retrieved on Feb. 27, 2020, retrieved from URL <https://www.prnewswire.com/in/news-releases/microstrategy-2019-the-world-s-most-advanced-analytics-amp-mobility-platform-powers-decisions-for-every-moment-of-the-day-867142447.html>, 10 pages.

wikipedia.com[online], "Draft: Semantic Graph" Nov. 9, 2018, retrieved on Nov. 15, 2018, retrieved from URL <https://en.wikipedia.org/w/index.php?title=Draft:Semantic_Graph&oldid=868720195>, 5 pages.

Office Action in U.S. Appl. No. 16/514,946, dated Jan. 5, 2022, 13 pages.

Office Action in U.S. Appl. No. 16/589,053, dated March 2, 2022. 20 pages.

Office Action in U.S. Appl. No. 16/677,183, dated Sep. 10, 2021, 26 pages.

Office Action in U.S. Appl. No. 16/677,427, dated Nov. 5, 2021, 30 pages.

Office Action in U.S. Appl. No. 16/678,948, dated Mar. 31, 2022, 17 pages.

Office Action in U.S. Appl. No. 16/677,183, dated May 4, 2022, 31 pages.

(56) References Cited

OTHER PUBLICATIONS

Office Action in U.S. Appl. No. 16/677,427, dated May 5, 2022, 37 pages.
Notice of Allowance in U.S. Appl. No. 16/589,053, dated Sep. 8, 2022, 15 pages.
Office Action in U.S. Appl. No. 16/514,946, dated Aug. 26, 2022, 15 pages.
Office Action in U.S. Appl. No. 16/677,183, dated Nov. 9, 2022, 25 pages.
Office Action in U.S. Appl. No. 16/677,427, dated Oct. 18, 2022, 46 pages.
Office Action in U.S. Appl. No. 16/678,948, dated Nov. 10, 2022, 15 pages.

\* cited by examiner

User Action Log (300)

| User ID | Object ID | Date/Time | Action Type | Context | ... |
|---|---|---|---|---|---|
| 2645 | 21657 | 4/5/19, 2:23p | Open | New York City; Phone | ... |
| 6234 | 84652 | 4/5/19, 3:43p | Share | Desktop Computer | ... |
| 2345 | 69731 | 4/6/19, 8:27a | View | Near users 2353, 2532 | ... |
| 568 | 24687 | 4/6/19, 9:45a | Edit | Topic: Budget | ... |
| ... | ... | ... | ... | ... | ... |

User Ratings (310)

| User ID | Object ID | Date/Time | User Input | ... |
|---|---|---|---|---|
| 142 | 462537 | 4/2/19, 7:45a | Comment: "Very helpful..." | ... |
| 9567 | 73457 | 4/6/19, 8:12a | Comment: "Needs Work..." | ... |
| 3241 | 62487 | 4/6/19, 4:10p | Rating: 8.2/10 | ... |
| 1224 | 51436 | 4/7/19, 1:41p | 👍 | ... |
| 6457 | 55426 | 4/7/19, 2:33p | ★★★★☆ | ... |
| 3224 | 132497 | 4/8/19, 9:02a | ... | ... |
| ... | ... | ... | ... | ... |

FIG. 3

| Object Data | | Opinion Measures | | | | | |
|---|---|---|---|---|---|---|---|
| Object ID | Object Type | User 1 | User 2 | User 3 | User 4 | User 5 | ... |
| 2856 | Document | 1.0 | -- | -- | -- | -- | ... |
| 8573 | Metric | -- | -- | 0.3 | -- | 1.1 | ... |
| 1093 | Data Cube | -- | 2.2 | -- | 0.5 | -- | ... |
| 3847 | Report | -- | -- | 3.8 | -- | -- | ... |
| 9862 | Column | 2.1 | -- | -1.0 | 1.1 | 3.3 | ... |
| 4872 | Line Graph | -- | -- | -- | -- | -- | ... |
| 3887 | Document | -- | -- | -- | -- | -- | ... |
| 7563 | Prompt | -- | -- | -- | 5.5 | -- | ... |
| 1043 | Synonym | -- | 2.3 | -- | -- | -- | ... |
| 2387 | Attribute | -- | -- | -1.7 | -- | 0.4 | ... |
| ... | ... | ... | ... | ... | ... | ... | ... |

FIG. 4

INCORPORATING OPINION INFORMATION WITH SEMANTIC GRAPH DATA

CROSS-REFERENCE TO RELATED APPLICATIONS

This application claims the benefit of priority to U.S. provisional patent application No. 62/801,239, filed on Feb. 5, 2019, U.S. provisional patent application No. 62/801,290, filed on Feb. 5, 2019, and U.S. provisional patent application No. 62/821,132, filed on Mar. 20, 2019. The entire contents of each of the prior applications is incorporated by reference.

BACKGROUND

The present specification relates to incorporating and using opinion information in semantic graph data.

SUMMARY

In some implementations, a computing system stores semantic graph data indicating objects and relationships among the objects. The objects can be data representations for people, places, physical things, topics or concepts, data, and more. For example, different types of objects may represent users, locations, documents, visualizations, devices, data sets, data elements (e.g., columns, rows, records, fields, etc.), and so on.

The semantic graph and associated components can be configured to capture, store, and use opinion data that provides measures of user sentiment regarding items represented in the semantic graph. For example, the semantic graph may include opinion data that indicates opinions, sentiment, preferences, affinity, popularity, and/or other information about how users relate to or subjectively perceive objects indicated by the semantic graph. The opinion data can indicate sentiment of users with respect to individual documents, data sets, and ultimately any item represented in the semantic graph. For example, the semantic graph can store data indicating characteristics of objects of various types along with opinion data for some or all of the objects.

The opinion data of the semantic graph can be used to generate recommendations, search results, and other content, as well as to provide user interface customizations and customizations of other interactions with users. The system can use a user's opinions to modify the user experience for the user. For example, the system can use the opinion data indicating a user's preferences to identify recommended documents and other content to provide to the user. The system can also identify content for a particular user based on the opinion data about the preferences of other users, especially other users who have a connection to particular user. For example, the preferences of employees in the same department as the first user or the preferences of users in the same job role as the first user may be used to provide content that is likely to be of interest to the first user. As another example, the opinion data for many users may be used to evaluate content to provide to the first user, with opinion measures for each user being weighted by that user's connection to the first user. As a result, the opinions of users that are more strongly connected to the first user (e.g., users that the first user has a high opinion of) have more influence in the system's evaluation than users that are more weakly connected to the first user. In general, the opinion data indicating a user's sentiment toward a particular object represented in the semantic graph can be expressed and stored as a weight for an edge in the semantic graph that connects a user object representing the user and the particular object.

The opinion data can quantify user sentiment with scores or weights that are derived from a variety of sources, including from explicit indications from users and implicit indications from users. Explicit signals include user inputs such as ratings, classifications, designation of a document as a favorite, indication of a "like" or "dislike," tags and annotations submitted by users, and other user inputs in which a user intends to enter a preference. Implicit signals include user actions that do not explicitly specify a preference, but allow the system to infer user sentiment. For example, the duration and manner in which users access and interact with documents and other objects, as well as inaction or lack of use with some objects, can reveal a user's opinion. The documents a user selects to view, and the portions or elements within the documents that the user interacts with can be significant indicators of the user's preferences. Thus, even if the user does not intend to convey sentiment information and does not explicitly specify an opinion, a computing system can infer the user's opinion from user behavior. To make the inferences about user opinions, the system can assess discrete actions as well as patterns or trends of multiple user actions over time, potentially over varying periods of time.

Opinion data can be stored in the semantic graph and used at any of various degrees of granularity. For example, in some implementations, opinion data is generated and stored for individual users and indicates each user's levels of preference or affinity for individual objects represented in the semantic graph. The opinion data can be stored with further levels of specificity, such as showing different sentiment measures for a user and an object corresponding to different contexts.

As another example, opinion data may be stored at a higher level of granularity, such as storing individual user's preference with respect to categories or groups of objects rather than individual objects. As another example, opinion data can combine the opinion information of different categories or groups of users with respect to individual objects or with respect to categories or groups of objects.

To facilitate different aggregations of opinion information, the opinion data of the semantic graph may be stored at a fine-grained level, e.g., at the level of individual users and objects, or even at the level of individual interactions (e.g., individual document accesses, individual ratings submissions by users, and so on). Different aggregations of the opinion data can then be made to determine more general opinion measures. For example, the opinion scores of multiple users (e.g., users in a particular department, or users in a particular job role) with respect to an object can be aggregated to determine an opinion score reflecting the general or overall sentiment about the object. Opinion measures that aggregate the opinion measures of all users or only proper subsets of the users can be generated. An advantage of storing opinion information at the level of individual users and objects is that it allows different aggregation techniques or scoring functions to be used for different applications, e.g., determining aggregate measures as a maximum, minimum, mean, median, geometric mean, or other function of a set of opinion scores for individuals.

To facilitate the generation of opinion data, the system also acquires and stores usage information associated with objects represented in the semantic graph. The usage information can indicate any of various actions taken using business analytics information. For example, usage data can be generated and stored on a user-specific basis, and for individual access actions in the system. The usage data can identify accessed data elements or other objects (e.g., documents, document components, data sources, database records, entity metrics, etc.), as well as the context of the access (e.g., a user identity, a user role, user permissions, an applicable task or workflow, a pattern of accesses, an application used, etc.). A wide variety of types of usage can be tracked and stored in usage data, including actions to retrieve, generate, edit, save, share, and so on.

The system associates opinion data with the semantic graph and uses the opinion data to adjust the weights for connections between objects represented in the semantic graph. The opinion data can then be used to customize or personalize output of the computing system, so that when the semantic graph is queried to perform an action (e.g., to generate a recommendation, a suggestion, a prediction, etc.), the output is customized due to the sentiment indicated by the opinion data for the user and/or opinion data indicating the sentiment of other users. For example, to respond to a particular request, a dynamic set of weights can be generated using a customized aggregation or weighting of the opinion data. Different users can have different customized weightings for the same objects and connections, based on the sentiment they have expressed explicitly through ratings and implicitly through general usage of a computing system.

In one general aspect, a method includes: storing, by one or more computers, semantic graph data indicating objects relationships among the objects; generating, by the one or more computers, opinion data indicating user sentiment with respect to the objects, the opinion data being generated based on explicit indications of user opinion and/or inferences of user opinion from user actions with respect to the objects; identifying, by the one or more computers, a particular object of the objects indicated by the semantic graph; determining, by the one or more computers, an opinion measure for the particular object based on the generated opinion data; and providing, by the one or more computers, output data to a client device, where the output data is generated based on the opinion measure for the particular object.

Implementations may include one or more of the following features. For example, the method may include receiving a query. The particular object is identified as representing a candidate search result for the query, and providing the output data comprises providing search results that are selected based on the opinion measure for the particular object or are ranked based on the opinion measure for the particular document.

In some implementations, determining the opinion measure for the particular document comprises determining, as the opinion measure, a score representing the sentiment of a particular user with respect to the particular object.

In some implementations, the method includes receiving a request, where the identifying, determining, and providing are performed in response to receiving the request. Determining the opinion measure for the particular document comprises determining, as the opinion measure, a score representing an aggregation sentiment scores for multiple users with respect to the particular object.

In some implementations, the score is generated based on sentiment scores in the generated opinion data for a proper subset of the multiple users, the proper subset of the multiple users being determined based on the request.

In some implementations, the method includes receiving a request associated with a particular user. The opinion measure for the particular object is generated based on a (i) an opinion measure for the particular user with respect to the particular object (ii) an opinion measure for the particular user with respect to user objects representing other users, and (iii) opinion measures of the other users with respect to the particular object.

In some implementations, the opinion measure for the particular document is based on opinion measures with respect to objects representing users associated with the document. As an example, the opinion measure for a document may be based on opinion measures indicating how popular or respected the author is, or a degree of connection in the semantic graph between a user initiating a search and the author of the document.

In some implementations, the particular object represents a document, and the opinion measure is generated based on opinion measures for multiple objects that represent elements of the document or represent data referenced by the document. For example, the opinion measure for a document can be based on opinion measures for visualizations in the document, topics of the document, data sources (e.g., data sets, data tables, servers, etc.) the document content is drawn from, and so on.

In some implementations, the output data is provided to a client device associated with a particular user, and the opinion measure is generated based on opinion measures indicating sentiment of the particular user with respect to the multiple objects. The output data can be provided for presentation at the client device.

In some implementations, the generated opinion data comprises weights for connections in the semantic graph between individual users and the objects in the graph.

In some implementations, the output data indicates a recommendation to a user or a response to a request from a user.

In some implementations, the opinion measure is a score that is aggregated from scores in the opinion data that respectively indicate opinion of different users with respect to the particular object. For example, the opinion measure may be a weighted combination of aggregated opinion scores.

In some implementations, the opinion measure is a score that is based on scores in the opinion data indicating sentiment with respect to objects other than the particular object that have connections to the particular object in the semantic graph. For example, the opinion measure for the user with respect to the particular object may be based on opinion scores or opinion graph weights for the user with respect to other users as well as those users' scores or weights with respect to the particular object. Similarly, the opinion measure for the user with respect to the particular object may be based on opinion scores or opinion graph weights for the user with respect to other objects related to or connected to the particular object in the semantic graph (e.g., topics, calculations, visualizations, etc.) The weightings of these other connections when determining the opinion measure may vary according to the object types for the other objects as well as a type of connection between the other objects and the particular object.

In some implementations, the method includes: identifying multiple objects representing candidate search results for a query; obtaining, for each of the multiple objects, (i) an opinion measure, based on the generated opinion data, indicating sentiment of one or more of the multiple users, and (ii) a relevance measure indicating relevance of the object with respect to the query; determining, for each of the multiple objects, a combined measure based on the opinion measure for the object and the relevance measure for the object; and ranking the multiple objects based on the combined measures. The output data indicates a highest-ranking subset of the multiple objects.

In some implementations, generating the opinion data comprises generating opinion data indicating user sentiment of each of multiple users with respect to the objects of each of multiple users.

Other embodiments of these aspects include corresponding systems configured to perform the actions of the methods, apparatus configured to perform the actions of the methods, and computer programs (e.g., stored on non-transitory computer-readable media) configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 3 is a table illustrating an example of data used to generate opinion information.

FIG. 4 is a table showing an example of opinion data for different users with respect to various objects represented in a semantic graph.

Like reference numbers and designations in the various drawings indicate like elements.

DETAILED DESCRIPTION

Figure 1:
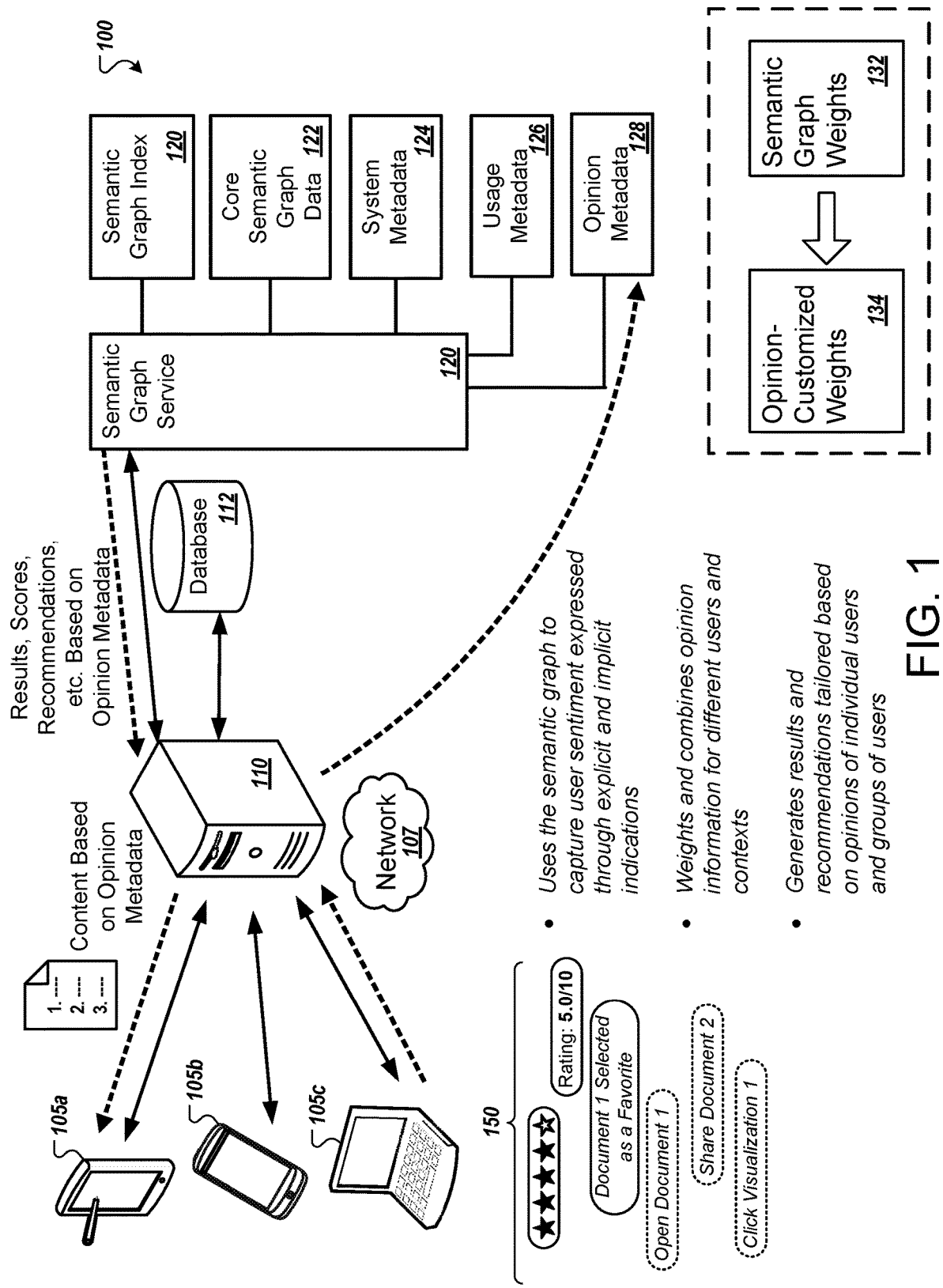
FIG. 1 is a diagram showing an example of a system for incorporating opinion information with semantic graph data.

FIG. 1 is a diagram showing an example of a system 100 for incorporating opinion information with semantic graph data.

In general, semantic information can be used by many types of enterprise systems, such as database systems, online analytical processing (OLAP) systems, search engines, and others. Traditionally, semantic data is used to translate database table and other data formats into human-readable forms. Semantic data can provide information about the identity of objects, the meaning of different objects, relationships among objects, and so on. For example, semantic information may indicate that a particular column of data represents a particular attribute or metric and may indicate the data type of the data. Semantic data that indicates the categories or types of objects is useful, but labels and classifications alone typically do not indicate the full scope of the complex interactions, relationships, and histories among objects.

In general, the semantic graph provides an ability to better provide personalized, contextualized information from what otherwise may be a sea of static and flat data without the semantic graph and associated metadata. A semantic graph can indicate enhanced relationships between objects. For example, the semantic graph can include different weights for connections between objects, and the values of the weights can vary dynamically over time. In addition, the semantic graph may indicate multiple different types of connections between objects, as well as specifying directionality of the connections.

The semantic graph and associated metadata can be used to automatically generate personalized recommendations and content to end users, for example, based on the identity of the user and the user's current context. The semantic graph can be used to associate objects with telemetry information, such as usage information that indicates how objects are used, how often objects are used, who the objects are used by, and so on. The relationships modeled with the semantic graph can be varied and complex. Even for only two objects, there may be a multi-dimensional connection between them with different weights representing strengths of different relationships or properties. In this sense, there may be multiple connections between objects representing different types of relationships or different aspects of a relationship (e.g., one weight for co-occurrence frequency in documents, another weight for a degree that one object defines the meaning of the other, another weight for how commonly objects are accessed by the same users, and so on). The weights for the connections dynamically adjusted over time. With this information, applications can better identify which objects out of a large set (e.g., thousands, millions, or more) are most important and most related to each other.

Opinion data provides an important dimension between the objects represented in the semantic graph. Connections or edges between objects can have one or more associated opinion weights, which can be opinion measures that indicate user sentiment (e.g., opinions, preferences, affinity, popularity, and so on). The opinion measures can be used to select and rank search results, select content to recommend, make predictions, and otherwise influence the operation of a computer system. In some implementations, the opinion measures can be used as confidence measures, to determine whether or not the computing system will take an action. For example, a system may identify a candidate content recommendation for a user (e.g., a prompt, document, visualization, etc.), and determine an overall opinion measure for the content. If the opinion measure satisfies a threshold the content is provided, and if the opinion measure does not satisfy the threshold the content is not provided. This opinion analysis can be performed in addition to or as a part of other evaluations by the computing system, e.g., evaluation for relevance, contextual appropriateness, and so on.

Many different types of objects can be identified and characterized using the semantic graph. For example, objects may represent data sources, data cubes, data tables, data columns, data fields, labels, users, locations, organizations, products, metrics, attributes, documents, visualizations (e.g., charts, graphs, tables, etc.), and many other data items or concepts.

Opinion information can be stored for each object, as well as for each user, which can cause the semantic graph to be interpreted differently for each user. For example, the opinion data for a user can provide a personalized lens to interpret the data. User information can be used to dynamically adjust the effective weights between objects in the semantic graph to alter search results, recommendations, application behavior, and other aspects of the user's experience. In addition to storing and using opinion data, the system can capture and store information about various types of context, such as data indicating a user's geographic location, the identity of a user's device, a device type or capabilities of the user's device, a time of day, an identity of another user or device nearby, an application open on the user's device, text on a user interface, a current task or workflow, keywords of recent queries or recently viewed documents, and so on. The contextual information can be used to determine context-based weights that are used in evaluations in addition to opinion-based weights.

The semantic graph can also indicate weights for levels of security, access restrictions, and trust for objects. For example, the semantic graph data can indicate the status of certain objects being certified or not, as well as the level of certification and the authority that provided the certification. Certified content is often more useful than content that is not certified, and so application content can give higher weight or higher preference to certified content. In general, the connections and weights for the semantic graph can indicate higher weights for higher-quality content.

The semantic graph provides a framework to integrate various different types of data from different sources, e.g., presence data indicating locations of users, access control data indicating user privileges, real-time application context, user interaction histories, query logs, and so on. Further, the relationships between objects are not limited to a particular use or domain. For example, the usage information and history that is generated from user-submitted search queries and responses can affect the weights between objects used for much more than carrying out searches, e.g., also for personalizing an interface for document authoring, for system performance tuning, for recommending documents, and more.

The semantic graph, through the various associated weights for connections between objects, provides a very useful way for a system to understand the relative weights between objects. In many cases, the meanings of different items and their relative importance is revealed over time through usage information, such as the frequency with which that users use certain objects together in document or a particular visualization. The overall amount of use of different objects (e.g., number of accesses over a period of time) is also a strong signal that can be used to rank objects relative to each other.

As users interact with an enterprise platform, they contribute information and meaning to the semantic graph. As an example, a database may have a column labeled "EFTID," and the user may know that values in the column represent a unique customer unique ID. The system obtains new information about the meaning of the column as the user interacts with the data, for example, by renaming the column, referencing the data in a visualization, using the data in an aggregation or along an axis, etc. The understanding and context that the user has (e.g., by understanding the meaning of the data) can be at least partially revealed to the system through the user's use of the data over time. The system uses the usage data to capture these indications of meaning and feeds them back into the graph, e.g., through adjusting connections between objects and adjusting weights for connections. A number of contextual cues from user actions can be identified by the system and used to update the semantic graph and optimize the operation of the system.

Information in the semantic graph and associated metadata can be stored on a user-by-user basis and/or at other levels of aggregation (e.g., by user type, by organization, by department, by role, by geographical area, etc.). Opinion information and usage information are often stored on a per-user basis to account for the particular actions users have taken and the particular items they have viewed, rated, and otherwise interacted with.

Users can also be grouped together and their respective opinion information aggregated. For example, users may have data in the semantic graph indicating their attributes, such as their organization, department, role, geographical area, etc. The system then uses that information to determine the overall opinion measure, e.g., an averaged or consensus opinion score, for a group of users. For example, to determine opinion measure for the set of users in a particular department, the system can identify user objects in the semantic graph that have a connection of a certain type (e.g., a "member of" connection) to the particular department. With this set of users, the system dynamically combines the sets of opinion data for the individual users identified. In this manner, the system can aggregate opinion information at any appropriate level as needed.

In the example of FIG. 1, a server system 110 provides analytics functions to various client device 105a-105c. The analytics functions can include serving documents, answering database queries, supporting web applications, generating documents (e.g., reports, dashboards, visualizations, etc.), predictively providing content, and so on. The server system 110 can include one or more computers, some of which may be remotely located or provided using a cloud computing platform. The server system communicates with the client devices 105a-105c through a network 107.

The server system 110 has access to a database 112 that stores data that is used to provide the analytics functions. For example, the database 112 may store documents, data sets (e.g., databases, data cubes, spreadsheets, etc.), templates, and other data used in supporting one or more analytics applications.

The server system 110 stores data for a semantic graph, which can include, among other data, a semantic graph index 120, core semantic graph data 122 (e.g., including object definitions, semantic tags, identifiers for objects and connections, etc.), system metadata 124, usage metadata 126, and opinion metadata 128.

The system may be arranged to provide access to the semantic graph through a semantic graph service 120. For example, the system may provide an application programming interface (API) allowing software modules to look up different information from the semantic graph. The semantic graph and associated metadata can be stored in various formats. As an example, a core set of structured metadata identifying objects and their properties can be stored in a database. Additional associated data can be stored in the same manner or at other locations. For example, a high-speed storage system can store and update opinion metadata, system metadata, and other types of information that are constantly being updated to reflect new interactions. This metadata can be associated or linked to the core structured metadata for the objects by referencing objects through the identifiers or other references defined in the core semantic graph structured metadata. The semantic graph service 120 may then provide information to influence various other functions of the enterprise system, such as a search engine, a content recommendation engine, a security or access control engine, and so on. Although the storage of the semantic graph data and associated metadata may be stored at diverse storage locations and across different storage systems, the semantic graph service 120 provides a unified interface for information to be delivered. Thus, the service 120 can provide access to diverse types of data associated with the semantic graph through a single interface. The semantic graph service 120 can provide a consistently available, on-demand interface for applications to access the rich interconnectedness of data in an enterprise system.

As an example, a query response engine can submit a request to the semantic graph service 120 that indicates a certain context. The context information may indicate, for example, user context (e.g., a user identifier), location context (e.g., GPS coordinates or a city of the user), application context (e.g., a document being viewed), or other contextual factors. In some cases, the request indicates one or more context objects (e.g., user objects, location objects, document objects, etc.) and the semantic graph service 120 provides a list of the related objects and scores of how relevant the results are to the context objects. If a recommendation engine submits a request for results of a certain type (e.g., documents, media, etc.) given a certain context, the semantic graph can provide results that identify objects selected based at least in part on the particular usage history and other data associated with the context.

The semantic graph service 120 may use both general weights and general opinion information, e.g., across all users, as well as specific weights and specific opinion information tailored to the context. For example, all data may be used to define a general weight that is used for a connection in the semantic graph when no specific context or user is specified. When a user context is specified, the general weight may be adjusted based on user-specific usage data and weightings. Thus the results from the semantic graph service 120 can blend general and context-specific information when appropriate. Of course, if specified in a request or for certain types of requests, responses for a context may be generated using only metadata relating to the context in some implementations.

Referring still to FIG. 1, as users interact with the computing system 110, they provide explicit and implicit sentiment indications 150 with respect to various objects represented in the semantic graph. Examples of explicit sentiment indications 150 are shown with solid-line borders and examples of implicit sentiment indications 150 are shown with dashed-line borders. A user may provide an explicit rating of content by, for example, selecting a user interface control to "like" or "dislike" content, to provide a star rating, to enter a numerical rating, to provide text of an annotation or review of content, or to mark a content item as a favorite. A user may implicitly provide an indication of sentiment through any of various actions with respect to a content item, such as accessing, saving, opening, viewing, clicking, sharing, editing, deleting, or archiving.

As users go about their normal use of documents, applications, web pages, and other resources, information about these actions are provided to the server system 110. A sentiment analysis module of the server system 110 (or optionally of a different computing system) analyzes the user actions to determine the preferences represented by the actions. For example, a user sharing a document with another user may be determined to increase the sharing user's sentiment toward the document. As another example, a user deleting a document may be determined to decrease the user's sentiment toward the document. These changes in sentiment of specific users toward specific objects can be quantified in opinion measures, such as weights between edges in the semantic graph. In particular, the opinion measures can be weights between user objects representing users and other objects representing items the users interact with (e.g., documents, data, other users, etc.).

Semantic graph data 122 can be stored that indicates objects and relationships among the objects. As the devices 105*a*-105*c* interact with the server system 110, usage metadata 126 and opinion metadata 128 are generated. The usage metadata 126 can indicate levels of usage of the objects indicated by the semantic graph data 122, for example, by including a log of individual usage actions. The usage metadata 126 indicates the contexts in which the objects are used, e.g., a set of context information to describe the context in which each action occurred. The opinion metadata 128 can represent sentiment measures derived from usage logs or the usage metadata 126, as well as explicit user indications of sentiment (e.g., ratings, comments, etc.).

For example, if a user is viewing a visualization, dashboard, document, or other content item and provides a rating or marks the content item as a favorite, the system uses that rating to adjust the opinion measure between the user object for the user and the content item. As a result, the updated opinion measure can alter the recommendations and search results later provided to the user and to other users.

In some cases, a content item such as a document may include or be associated with multiple objects. A user's rating of or interaction with one object may result in the opinion measures for multiple objects being adjusted. For example, the semantic graph may define an object for a document, as well as other objects representing visualizations in the document and data sets or data sources that the visualizations are based on. When the user rates the document, the opinion measure for the document is updated, and some or all of the sentiment indicated for the document may be propagated through to the opinion measures for the objects representing the visualizations and data sets. The magnitude of the change in opinion measures may be the same as or in some cases less than the magnitude of change for the document as a whole. In addition, user actions may reflect differing levels of sentiment toward different objects in the document. For example, the system may determine the duration and frequency with which a user interacts with the different visualizations, and adjust the corresponding opinion measures accordingly. For example, a visualization that is interacted with frequently may have its opinion measure increased while a visualization that is not interacted with may not have its opinion measure changed.

The server system 110 or another system can provide a query associated with a user. This query can represent a query initiated by a user using a client device. As another example, the query may be initiated by the server system 110, for example, as part of generating a recommendation or prediction that the user did not request. In the example of FIG. 1, the query relates to a user of client device 105*a*. The query can include or be associated with context data that identifies the user and other context. The query may represent a request for recommended objects, potentially of a particular type such as a request for recommended reports given the current context, a request for relevant users given the current context, a request for data sources given the current context, etc. The query may include query terms, such as a user question or keywords, or may not.

In some implementations, determining the custom weightings can start with general semantic graph weights 132 that represent relationships between objects. These weights may represent, for example, an aggregate measure of the strength of relationships between objects across various types of data collected. From this set of data, the system may select a subset of the opinion metadata 128 that is particular relevant to the query, such as opinion measures indicating sentiment of the same user associated with the query, and/or opinion measures of users determined to be similar to the user associated with the query. The semantic graph service 120 can combine the general weights 132 with the opinion measures to produce opinion-customized weights 134 to generate a response to the query, which is provided to the server system 110. The response may identify objects stored in the database 112 and may include scores for or a ranking of objects, as well a potentially other information (e.g., semantic tags or labels, associated keywords, object type definitions, object attributes, etc.)

The server system 110 uses the response from the semantic graph service 110 to generate and provide content to the client device 105a. For example, when preparing search results to a user query, the server system 110 may process the information from the semantic graph service and use it to select or rank search results to provide to the user's client device 105a. As another example, the server system 110 may provide recommendations of objects, such as documents to view, attributes to include in a document being edited, visualizations that may be of interest for the current data set, and so on.

The information provided by the opinion metadata can be used in various ways to enhance a user's experience. One way is to prioritize candidate answers to a user request. For example, a user query may provide a keywords that are mapped to several different types of objects, e.g., a customer, a customer name, a location, and so on. Using the opinion data representing the requesting user's explicit and implicit preferences, the server system can determine which of the different objects has the highest opinion measure and respond using that highest-sentiment object. In a similar manner, the server system 110 may select or disambiguate an interpretation based also on the opinion measures of other users with respect to the objects, especially for subsets of users determined to have strong connections to the requesting user in the semantic graph. As another example, the opinion metadata overall may provide indications of the popularity of different objects, which the server system 110 can use to select among different objects.

Another benefit of the opinion metadata 128 is that it can provide an indication of trust of different objects. When determining which content to provide or recommend to a user, the server system 110 can use the opinion measures of users as a measure that the users trust the objects. These opinion measures may be provided to client devices 105a-105c for display, so that users can see the level that different content items are trusted among a larger set of users.

Figure 2:
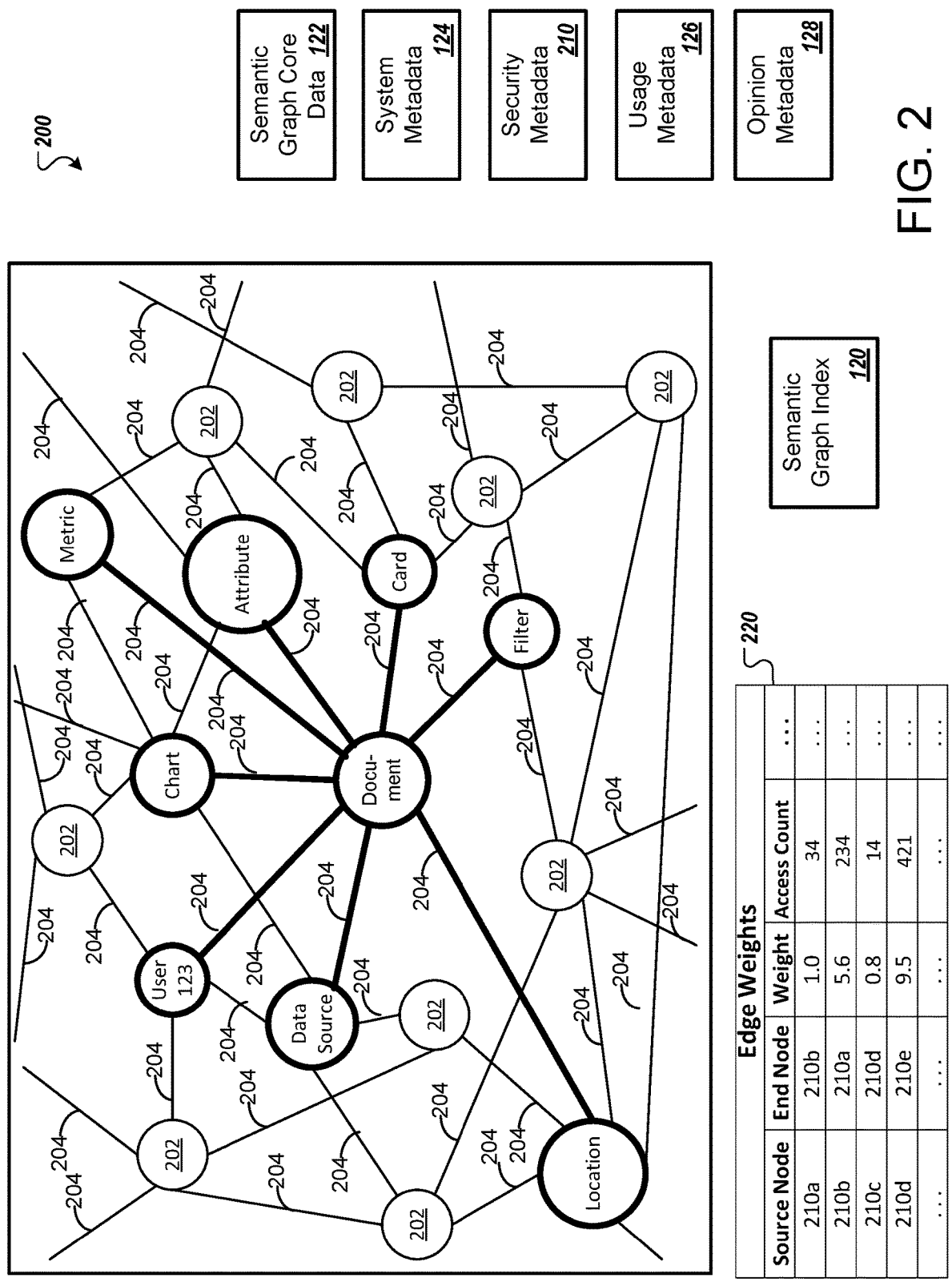
FIG. 2 is a diagram showing an illustration of a semantic graph.

FIG. 2 illustrates an example illustration of a semantic graph 200. Objects are illustrated as nodes 202 and relationships or connections between the objects are illustrated as edges 204. Each node 202 can have a variety of information stored to describe the object it represents, e.g., an object type for the object, a location of the object (e.g., in a file system), an identifier for the object, attributes for the object, etc. The nodes 202 and edges 204 that identify the objects and their connections may be stored in the semantic graph core data 122, along with definitions, semantic tags, and more.

The edges 204 have weights 220 associated with them, e.g., values indicating magnitudes or strengths of the respective connections. Other information indicating the nature or character of the edges 204 can also be stored. Although the illustration only shows one edge 204 between each pair of nodes, there may be multiple different relationships between two objects, which may be represented as, for example, multiple edges 204 with different weights or an edge with multiple dimensions or aspects. In some implementations, an edge 204 and an associated weight represents an overall affinity of objects. In some implementations, Different edges 204 may represent different types of relationships, e.g., dependency (e.g., such as a document requiring data from a data source), co-occurrence, an object being an instance of a class or category, an object being a part of another object, and so on. Edges 204 may be directional. For example, the weight or strength of connection from Object A to Object B may be greater than the weight from Object B to Object A.

In general, the semantic graph 200 can be a central knowledge graph of data assets and user context that is used by an analytics system or other computing system. The semantic graph 200 can capture the relationships of any and all types of business information, processes, and people. The semantic graph 200 can include descriptive metadata for attributes, metrics, entities, elements, security, access control lists, models, calculations, and more. The semantic graph 200 can provide information about various types of content, such as analytical reports, dossiers, documents, and applications. Similarly, the semantic graph 200 can capture information including user telemetry about, for example, content, data, and user events. The semantic graph can capture information including system telemetry about, for example, system events, availability, and query execution. All of this information can be indexed, as represented by the semantic graph index 120.

The information in the semantic graph 200 can be used by an analytics system or other computing system in a variety of ways. For example, the semantic graph 200 can be accessed by a recommendation engine that recommends content for users based on user context. As another example, the semantic graph 200 can be accessed by an insight engine, such as functionality that is configured to assess data to automatically recognize patterns, generate insight, and generate models based on user context. The semantic graph 200 can also be used by a system optimization engine, which can optimizes a computing platform by automatically adjusting computing nodes and settings based on telemetry represented in the semantic graph and associated data. The semantic graph 200 can also be used by an expert engine that enables integration of expert predictive artificial intelligence capabilities, such as using semantic graph relationships and historical data to predict, prescribe, and anticipate actions within an analytics system. As another example, the semantic graph 200 can be used by a search engine or query response engine to identify, retrieve, select, rank, and filter results. Similarly, the semantic graph 200 can be used by a data enrichment engine to enhance data sets, recommend potential joins between data sets, and so on. Because the semantic graph 200 captures information about individual users, user contexts, and the actions and patterns occurring in the analytics platform, each of these functions can customized or personalized for individual users or for groups of users (e.g., by role in an organization, by department, and so on).

The semantic graph 200 has various types of metadata that describe aspects of the objects and connections. The system metadata 124 can indicate the configuration of the system and performance measures. This metadata can be generated and stored for each device or module of an enterprise system, e.g., client devices, content servers, database servers, individual applications, etc. The usage metadata 126 can include records of the accesses made throughout the system to any of the objects represented in the semantic graph 200, as well as the nature or type of access. Security metadata 210 can indicate security policies, permissions and restrictions, histories of security decisions (e.g., to grant or deny access) and so on. The Opinion metadata 128 can indicate explicit or inferred opinions and preferences of users. For example, the opinion metadata 128 can store information about sentiment derived from user actions or user documents, preferences for some items over others, and so on. These types of metadata and others can be associated to identifiers for specific nodes 202 and connections 204, allowing the semantic graph to store information about specific instances of how nodes 202 and connections 204 were accessed.

The system metadata 124, usage metadata 126, and other types of metadata can be log files that show historical information about how an enterprise system operated and how it was used. In some implementations, the metadata is received as real-time or near-real-time telemetry that is measured, logged, and reported as transactions occur. For example, the metadata can collect and store a stream or feed of information from client devices, databases, query processing modules, web servers, and any other component of the enterprise system. Thus, the information can be used to detect performance limitations or emerging trends in usage as they occur and with a very fine-grained level of precision. The telemetry can indicate individual requests, transactions, and operations. In some implementations, some aggregate measures can also be provided, such as an overall load level of a device.

As discussed above, a semantic graph can be a logical layer of software that describes information stored in data systems using human-readable terms and provides metadata that can aid analysis of the data. One of the primary functions is to provide people with way to query databases using common business terms without having to understand the underlying structure of the data model.

A semantic graph can store or have associated with it (i) metadata describing the data in human-understandable terms along with (ii) usage data about how often the data is accessed, by whom, and relationship data about how objects are used together in analysis scenarios. There are a number of objects and metadata that may be stored as part of a semantic graph implementation: data objects, content objects, user objects, usage metadata, security metadata, system metadata, a semantic graph index, opinion metadata, and action objects.

Different vendors often different terminology for similar concepts. For example, a "dimension" or "attribute" for a data object may both represent the same or similar concept, e.g., a value that represents a property of a data object. Similarly, a "measure" or "metric" in a data set may both refer to the same or similar concept, e.g., a value that provides quantitative indicator, such as a result of a calculation or function.

Data objects in the semantic graph can refer to objects that appear to users as business concepts. For example, "customers", "products", "revenue" and "profit" are all common data objects in the semantic graph. A user will typically see those data objects in a user interface and can query the underlying database by interacting with the data objects. For example, a user may query the database by requesting "customers" and "revenue". The system will then query the database (or in many cases, multiple databases) to fetch the customer revenue data. Querying the system usually requires a number of complex database calls using SQL, MDX or APIs. From a user perspective, however, the complexity of how the data is stored, and the sophisticated query required to retrieve the results are automatically handled on behalf of the user.

Common types of Data objects include dimensions, measures, groups and sets, hierarchical structures, filters and prompts, geographic objects, date and time objects, and synonym objects. Dimensions (Attributes)—Dimensions and Attributes both refer to data that is typically (but not always) a noun, such as "Customer", "Product", "Country", or "Account". Dimensions can also have additional metadata associated with them to qualify them further. For example, a Dimension object can have further metadata describing it as a Person, which can, in turn, have further metadata describing the Person as being of type Employee.

Measures (Metrics or Key Figures)—Measures and Metrics both refer to data that would typically be used for calculations such as "Revenue", "Profit", "Headcount", and "Account Balance". Measures can also have additional metadata further describing how the Measure behaves. For example, additional metadata can describe whether bigger values or smaller values are "good" or whether a Measure represents a "currency".

Groups and Sets—Groups and Sets refer to objects in the semantic graph that represent grouping of data elements. For example, the "Top 10 customers" may be a group that represents the top Customers by some measure (for example Revenue). Groups and Sets can be a simple grouping such as "My Customers=Company 1, Company 2, and Company 3" or a rules-based grouping such as "My Top Customers=top 10 Customers by Revenue for Year=2018".

Hierarchical structures—Hierarchical structures provide metadata about the relationship between objects and object values in a semantic graph. For example, one such hierarchical structure may describe a Parts hierarchy where certain products are made up of parts.

Filters and Prompts—Filter and prompt objects provide a means to define variables that need to be set either by the programmer, system or end user prior to execution of the object. For example, a semantic graph may have a "Region" filter or prompt whose value must be defined prior to executing the query or content object that it is associated with.

Geographic objects—Geographic objects are objects associated with geographic concepts such as countries, regions, cities, latitude and longitude. Geographic metadata helps the consuming user or system map or perform geospatial calculations using the objects much more easily.

Date and Time objects—Date and Time objects are a special classification of objects that are associated with Dates and Times. This can be used for time based calculations (year over year analysis) or for displaying the object data on Date and Time-based output such as calendars.

Synonym objects—Synonym objects are a special classification of dimension and attribute objects that store alternate values to the values in the dimension objects. This is useful in cases where there are multiple common terms that are used to map to a specific value in the database. For example, in common usage, Coke and Coca-Cola are often used interchangeably when searching for information. The Synonym object stores such alternate values and maps them to a common value in the database.

Content objects in the semantic graph refer to content that is typically displayed to end users as an assembly of data objects. Content objects include:

Reports—Report objects are highly formatted, sectioned and paginated output such as invoices, multi-page tables and visualizations.

Dashboards—Dashboards objects are similar to Report objects in that they also display data and have formatting and visualizations. Dashboards differ from Reports in that they tend have summary data and key performance indicators instead of detailed pages of information.

Tables and Grids—Table and grid objects represent data in tabular format (with rows and columns). Tables and grids are often are included in Reports and Dashboards.

Visualizations—Visualization objects illustrate data in charts such as bar, pie and line charts.

Cards—Card objects store the key information for a specific topic and are built to augment and overlay third party applications with analytic information in the context of the user. The information in card objects can be presented to a user as a knowledge card or information panel, or the information may be presented through a voice interface or through other interactions.

User objects are people, groups and organizations that are represented in the semantic graph. These objects represent user accounts and groups of user accounts and are used to provide system access, security and rights to other objects in a semantic graph. Users are particularly important in the semantic graph because they are the actors in the system that create, interact with, and use the other objects in the semantic graph. A semantic graph provides an understanding of the relationship between users and the objects in the semantic graph as well as the relationships between the users themselves.

Usage metadata is information stored in a semantic graph about the usage of the objects in a semantic graph. This additional usage data provides information about which objects are used by which users, which objects are used together and which objects are the most and least popular in the system. Usage metadata also contains the context of the user when she interacted with the system. For example, what type of device she was using, where she was, and what data context she was in. This usage metadata, in addition to the other metadata in a semantic graph, provides a means to find relevant information for different users and usage context. Usage metadata is the primary differentiator between a semantic layer and a semantic graph. While a semantic layer primarily describes data in business terms and provides relationship information between the objects as a means to map these business terms to database queries, a semantic graph stores usage information to provide additional information about the weight of the relationships between objects in the semantic graph. Usage metadata can also contain information about when and where objects are accessed.

Security metadata is information stored in a semantic graph about which users have access to which objects, which privileges they have on the objects, and which data they have access to. The Security metadata can also contain special concepts such as whether the objects are certified, contain personally identifiable information or contain sensitive information.

System metadata is data about how the objects in the system perform. This can include system information such as error rates and run times for the objects. This information can be used by users and system processes to optimize performance of the system. For example, the system can automatically notify content authors if their content is experiencing slow load times or high error rates. The system can also use the system metadata in the semantic graph to automatically perform maintenance to improve performance of content. For example, if a content object has slow performance and there are many users that access that content on a predictable basis, the system could potentially automatically schedule execution of the content and cache the results so as to provide users with improved performance.

A semantic graph index indexes key values in the semantic graph so as to provide fast search and retrieval times. These key values may be a variety of types of information, such as keywords, semantic tags, object or node identifiers, connection or edge identifiers, and so on.

Opinion metadata is opinion information about the objects in a semantic graph that is provided by the end users. For example, users could give a 'thumbs up' or 'favorite' content to indicate that they like or find it useful. Other mechanisms such as a star system or commentary can also be employed as means of storing opinion metadata in a semantic graph. Opinion metadata is useful alongside usage metadata and affinity between objects to help find content that is both relevant to the user's context and of value based on opinion.

Action objects describe actions that can be taken on other objects in a semantic graph. For example, there may be an Action object that takes a Date and Time object and converts it from one format (24 hour) to another (12 hour).

A semantic graph can provide a number of benefits. For example, a primary goal of the semantic graph is to make access to complex business data systems easy for people without database or programming skills. The semantic graph can provide common naming and semantics to represent complex data models with otherwise obscure or non-human-readable names. The semantic graph can provide or support various services built atop it (for example, search or machine-learning-driven recommendation services) with metadata, relationships, and user-based context information that can help answer user questions and recommend the most relevant content to users. The semantic graph can include (or have associated with it) security and audit information to help secure data assets based on user security access profiles.

As an example of the use of data from the semantic graph 200, a recommendation engine can use the usage information and opinion information reflected in the semantic graph 200 to recommend documents and other content from a library. The library can represent a unified hub or corpus of content for users to access and collaborate on analytics. The recommended documents or other content can be based on user context (e.g., location, time of day, applications or documents open, people nearby, topics of current or upcoming scheduled meetings, and so on.) In making recommendations, opinion measures for a candidate content item to recommend can be based on the opinion data of the semantic graph 200, such as opinion weights of the user receiving the recommendation as well as other users nearby, users associated with the user in the semantic graph 200, and so on.

As another example, an insight engine can recommend answers to questions or queries using the semantic graph 200. For example, given an ambiguity in a query, the insight engine may resolve the most likely interpretation by using the objects and interpretations that have the highest affinity or highest sentiment indicated by usage weights and opinion weights. Even when there is no ambiguity, the sentiment scores may be used to determine what form of visualization to use to present content. For example, the system can determine which elements of a data set to illustrate based on a user's opinion scores showing sentiment with respect to visualizations of different types, and the level of interaction with or usage of visualizations of different types.

As another example, intelligent data preparation processes can use the semantic graph 200 to detect and recommend data joins. Using object definitions and connections in the semantic graph 200, a computing system can identify portions of data sets (e.g., such as columns of tables) that have the same or similar data types and/or the same or similar semantic meanings. Similar semantic meanings can be expressed explicitly in the semantic graph 200 or can be inferred from other aspects of the semantic graph 200. These semantic meanings may be determined through commonalities in labels or other identifiers in the semantic graph data. Similar semantic meanings can be determined through connections and weights in the semantic graph, for example, connections of a particular type having weights that satisfy a threshold. In addition, similar semantic meanings can be determined from commonalities in usage patterns, as reflected in the semantic graph 200, in addition to or instead of other techniques.

In general, usage data stored in or associated with the semantic graph 200 can include records of individual actions or transactions within an enterprise system. The object data indicates, for example, an object identifier and an object type for each object. The usage data indicates the context and nature of the use, such as the user identifier for a user associated with the action, the type of action performed, the time of day, the location of a user initiating the action, an indication of a broader task or workflow (such as fulfilling a type of user-initiated action or request) that the action is part of, an indication of nearby users, and so on.

With usage data of this kind, an enterprise system can aggregate the data in various ways, and then use the aggregated data to generate customized recommendations, search results, predictions, user interfaces, and other outputs. For example, to respond to a user's search query, the system can use the semantic graph data to identify objects of a particular type or those associated with certain keywords or attributes. Then, for each of the identified objects, the system can then aggregate the usage data for the object. This can include a weighted combination of usage measures, for example, one that weights more highly the instances of use by the current user but still takes into account usage by other users. The weighting can take into account the similarity between the current context of the user and the context of prior uses, with higher similarity resulting in higher influence in the combined score. In addition, a weighted combination can also include components reflecting levels of use of other similar objects and actions, such as an aggregation of usage measures among other objects of the same type or other objects hosted by the same server.

With aggregated usage measures, the system can generate custom weightings for connections between objects. These custom weightings can be adjustments of the general edge weights of the semantic graph. Custom weightings can be determined for each request or transaction with the social network service, so that for each user and even for each different request involving the same user the weightings and thus outputs of the semantic graph service 120 may be different. The output of the semantic graph service 120 can include an identification of objects that are responsive to or relevant to the query it receives. An enterprise analytics system may then use the identification of objects to perform a number of actions, such as select search results (e.g., to a user's query to the analytics system), adjust the rank of search results, adjust a user interface (e.g., to select, rank, or arrange objects for view, such as to select items dynamically populated in a menu), provide recommended content, and more.

FIG. 3 shows tables 300, 310 illustrating examples of data used to generate opinion information.

The table 300 shows a user action log that includes actions that users performed with respect to different objects. The rows of the table 300 represent different actions by different users. The objects may represent any of various types of objects, such as documents, dashboards, files, visualizations, applications, data sources, data sets, and so on. As illustrated, the user action log can indicate a user identifier for the user initiating the action, an object identifier for the object the action was performed on, a timestamp, an indication of the type of action performed, and additional data, such as contextual factors related to the action (e.g., location, type of device used, identifiers for users nearby, current or recent topics of queries or other content, and so on).

The information in the table 300 represents instances of implicit indications of user sentiment. Each action on its own may not conclusively show a user's sentiment toward the object, but the server system 110 can evaluate patterns and trends of these actions to extract a measure of a user's sentiment. As part of this analysis, the server system 110 can assess whether an action by a user is repeated, the duration of the action, and other factors. For example, an initial view of a document may result in the server system 110 assigning a small opinion score for a user with respect to a document, but after subsequent views of the document by the user the server system 110 may apply increasingly larger increments to the opinion score.

The table 310 shows user ratings, which are examples of explicit user indications of sentiment. The rows of the table 300 represent different actions by different users. The table 310 indicates a user identifier for the user providing the rating, an object identifier for the object receiving the rating, a timestamp that the rating was submitted, and the content of the rating. Examples of rating content include text comments, numerical scores or ratings, ratings along a scale (e.g., four stars out of five), and a like or dislike, although may other types are possible. The server system 110 can use each instance of a rating to adjust the opinion measure for the user that provided the rating with respect to the object rated.

The server system can combine the sentiment indicated by the user action log of table 300 and the user ratings of table 310 into opinion measures that take into account both types of user feedback. For example, a user's actions with respect to an object as well as a user's submitted ratings for the object both are factored into the opinion measure for the user with respect to the object.

The actions and ratings for an object may be propagated to other objects that are not directly rated or interacted with. For example, when a user rates a document or interacts with a document, the resulting sentiment may be propagated in whole or in part to components of the document.

FIG. 4 is a table 400 showing an example of opinion data for different users with respect to various objects represented in a semantic graph. The table 400 shows examples of opinion measures of different users with respect to different objects. The opinion measures can represent opinion weights for edges in the semantic graph between user objects representing the users and the various objects.

To show how different users have different opinion measures for objects, the rows represent objects and the various opinion measures users have with respect to those objects. For example, in the first row, User 1 is shown to have an opinion measure of "1.0" with respect to the document assigned object identifier "2856." The other users listed do not have opinion measures defined for this object, which can represent that these users have not rated or interacted with the document. In the second row, for the metric assigned object identifier "8573," User 3 and User 5 have opinion measures of "0.3" and "1.1" respectively, indicating different levels of sentiment of those users toward the metric. In the example, higher opinion measures indicate more favorable sentiment, e.g., higher user ratings and/or more extensive use of the items represented by the objects.

Figure 5:
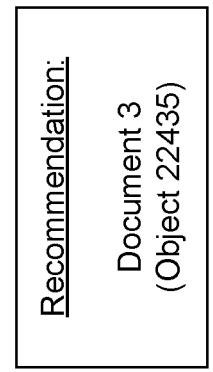
FIG. 5 is a diagram illustrating an example in which users have different opinion measures with respect to different objects, which results in different content items being recommended to the users.
Figure 5:
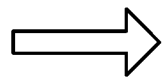
Figure 5:
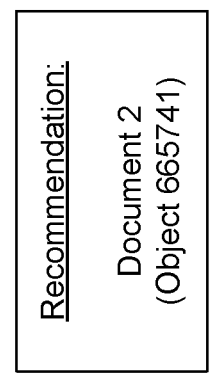
Figure 5:
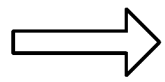
Figure 5:
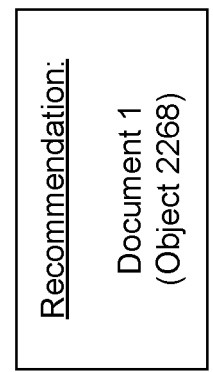
Figure 5:
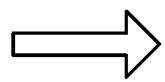

FIG. 5 is a diagram 500 illustrating an example in which users have different opinion measures with respect to different objects, which results in different content items being recommended to the users. The same technique can be used to provide customized query results, customized visualizations, and other customized interactions. The diagram shows three sets of edge weights for three different users. Due to the user's differing behavior with respect to the objects, they have different opinion measures for the objects.

When the server system 110 determines a document recommendation for the users, the server system 110 considers the opinion measures or opinion edge weights and determine which among the set of candidate documents provides the highest level of sentiment for each individual user. In the example, the set of candidate documents or candidate objects is the same for each of the users, but because the highest sentiment level is different for each user, each receives a different, personalized recommendation.

The opinion measures can represent any of various aggregations of opinion data. For example, the opinion measures for a user may, in some instances, be individual opinion weights for a connection between a user object and another object. In other instances, the opinion measure may be an aggregation of multiple opinion weights, such as opinion weights for a user with respect to any combination of the following: (i) an object such as a document, (ii) objects representing the components or data sources for the object, and (iii) users associated with the object. As another example, the opinion measure may be based on connections spanning multiple links in the semantic graph. As an example, the opinion weight of a user with respect to an object for a particular role or department may be used along with an opinion weight for the particular role or department with respect to a document object. The opinion weight for a role, department, or other group may be based on an aggregation of the opinion weights of members of the group with respect to the document object (e.g., an average, weighted average, median, minimum, maximum, etc.) As another example, the opinion measure for a user with respect to a document may be based on the user's opinion weights for connections with other users, as well as the other users' opinion weights (or other weights, such as usage weights) with respect to the document. The user's opinion weights with respect to users can be used as (or may otherwise set) different weightings of the other users' connection weights when determining the opinion measure. Any combination of these techniques can be used together, for example, with an opinion measure being based on an opinion weight of a user with respect to a document object, opinion weights of a user with respect to topic objects and component objects for the document, and the opinion weights of other users with respect to the document for other users that have at least a minimum level of connection to the user.

The server system 110 does not necessarily provide content based on opinion alone. For example, the server system 110 can combine the opinion measures with other measures, such as relevance measures, contextual measures, and so on. In general, the connections between objects in the semantic graph can have multiple dimensions representing opinion, usage, context, and other factors. In generating a score to evaluate objects, the server system 110 can generate combined scores for each of the different components or dimensions of the connection between objects. For example, the server system 110 may generate, for each candidate object, a combined score that is a weighted combination of the opinion weight, a usage edge weight, a context edge weight, and/or other edge weights. The server system 110 may then rank and select candidate objects using the combined weights.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more computers, the method comprising:
    storing, by the one or more computers, semantic graph data indicating objects and relationships among the objects;
    tracking, by the one or more computers, accesses to the objects by multiple different users and contexts in which the accesses to the objects were made;
    generating, by the one or more computers, opinion data indicating user sentiment with respect to the objects, the opinion data for the objects being generated based on inferences of user opinion derived from the tracked user accesses to the objects by the multiple different users;
    identifying, by the one or more computers, a particular object of the objects indicated by the semantic graph;
    obtaining, by the one or more computers, context data indicating a current context of a client device;
    determining, by the one or more computers, an opinion measure for the particular object based on the generated opinion data, the opinion measure for the particular object being determined by aggregating portions of the generated opinion data indicating sentiment with respect to the particular object, wherein the aggregation combines sentiment determined from tracked user accesses to the particular object by a plurality of the multiple different users, wherein the opinion measure is generated based at least in part on an aggregation of multiple items of opinion data for the particular object in which different opinion data for the particular object is weighted based on a level of similarity between the current context of the client device and the contexts of the tracked accesses from which the respective items of opinion data were generated; and
    providing, by the one or more computers, output data to the client device, wherein the output data is generated based on the opinion measure for the particular object.

2. The method of claim 1, comprising receiving a query; wherein the particular object is identified as representing a candidate search result for the query; and
wherein providing the output data comprises providing search results that are selected based on the opinion measure for the particular object or are ranked based on the opinion measure for the particular document.

3. The method of claim 1, comprising receiving a request, wherein the identifying, determining, and providing are performed in response to receiving the request; and
wherein the score is generated based on sentiment scores in the generated opinion data for a proper subset of the multiple users, the proper subset of the multiple users being determined based on the request.

4. The method of claim 1, comprising receiving a request associated with a particular user;
wherein the opinion measure for the particular object is generated based on a (i) an opinion measure for the particular user with respect to the particular object (ii) an opinion measure for the particular user indicating sentiment of the particular user with respect to other users, and (iii) opinion measures of the other users with respect to the particular object.

5. The method of claim 1, wherein the opinion measure for the particular document is based on opinion measures with respect to objects representing users associated with the document.

6. The method of claim 1, wherein the particular object represents a document, and the opinion measure is generated based on opinion measures for multiple objects that represent elements of the document or represent data referenced by the document.

7. The method of claim 1, wherein the output data is provided to a client device associated with a particular user, and wherein the opinion measure is generated based on opinion measures indicating sentiment of the particular user with respect to the multiple objects.

8. The method of claim 1, wherein generating the opinion data comprises setting weights for connections in the semantic graph between individual users and the objects in the graph based on the inferences of user opinion derived from the tracked user accesses to the objects by the respective users.

9. The method of claim 1, wherein the output data indicates a recommendation to a user or a response to a request from a user.

10. The method of claim 1, comprising identifying multiple objects representing candidate search results for a query;
obtaining, for each of the multiple objects, (i) an opinion measure, based on the generated opinion data, indicating sentiment of one or more of the multiple users, and (ii) a relevance measure indicating relevance of the object with respect to the query;
determining, for each of the multiple objects, a combined measure based on the opinion measure for the object and the relevance measure for the object; and
ranking the multiple objects based on the combined measures;
wherein the output data indicates a highest-ranking subset of the multiple objects.

11. The method of claim 1, wherein generating the opinion data comprises generating opinion data indicating user sentiment of each of multiple users with respect to the objects of each of multiple users.

12. A system comprising:
one or more computers; and
one or more computer-readable media storing instructions that, when executed by one or more computers, cause the one or more computers to perform operations comprising:
storing, by the one or more computers, semantic graph data indicating objects and relationships among the objects;
tracking, by the one or more computers, accesses to the objects by multiple different users and contexts in which the accesses to the objects were made;
generating, by the one or more computers, opinion data indicating user sentiment with respect to the objects, the opinion data for the objects being generated based on inferences of user opinion derived from the tracked user accesses to the objects by the multiple different users;
identifying, by the one or more computers, a particular object of the objects indicated by the semantic graph;
obtaining, by the one or more computers, context data indicating a current context of a client device;
determining, by the one or more computers, an opinion measure for the particular object based on the generated opinion data, the opinion measure for the particular object being determined by aggregating portions of the generated opinion data indicating sentiment with respect to the particular object, wherein the aggregation combines sentiment determined from tracked user accesses to the particular object by a plurality of the multiple different users, wherein the opinion measure is generated based at least in part on an aggregation of multiple items of opinion data for the particular object in which different opinion data for the particular object is weighted based on a level of similarity between the current context of the client device and the contexts of the tracked accesses from which the respective items of opinion data were generated; and
providing, by the one or more computers, output data to the client device, wherein the output data is generated based on the opinion measure for the particular object.

13. The system of claim 12, comprising receiving a query;
wherein the particular object is identified as representing a candidate search result for the query; and
wherein providing the output data comprises providing search results that are selected based on the opinion measure for the particular object or are ranked based on the opinion measure for the particular document.

14. The system of claim 12, wherein determining the opinion measure for the particular document comprises determining, as the opinion measure, a score representing the sentiment of a particular user with respect to the particular object.

15. The system of claim 12, comprising receiving a request associated with a particular user;
wherein the opinion measure for the particular object is generated based on a (i) an opinion measure for the particular user with respect to the particular object (ii) an opinion measure for the particular user with respect to user objects representing other users, and (iii) opinion measures of the other users with respect to the particular object.

16. One or more non-transitory computer-readable media storing instructions that, when executed by one or more computers, cause the one or more computers to perform operations comprising:
- storing, by the one or more computers, semantic graph data indicating objects and relationships among the objects;
- tracking, by the one or more computers, accesses to the objects by multiple different users and contexts in which the accesses to the objects were made;
- generating, by the one or more computers, opinion data indicating user sentiment with respect to the objects, the opinion data for the objects being generated based on inferences of user opinion derived from the tracked user accesses to the objects by the multiple different users;
- identifying, by the one or more computers, a particular object of the objects indicated by the semantic graph;
- obtaining, by the one or more computers, context data indicating a current context of a client device;
- determining, by the one or more computers, an opinion measure for the particular object based on the generated opinion data, the opinion measure for the particular object being determined by aggregating portions of the generated opinion data indicating sentiment with respect to the particular object, wherein the aggregation combines sentiment determined from tracked user accesses to the particular object by a plurality of the multiple different users, wherein the opinion measure is generated based at least in part on an aggregation of multiple items of opinion data for the particular object in which different opinion data for the particular object is weighted based on a level of similarity between the current context of the client device and the contexts of the tracked accesses from which the respective items of opinion data were generated; and
- providing, by the one or more computers, output data to the client device, wherein the output data is generated based on the opinion measure for the particular object.

17. The method of claim 1, wherein tracking the accesses to the objects by multiple different users comprises tracking different types of accesses to the objects; and
- wherein the aggregation of the portions of the generated opinion data is based at least in part on the types of accesses that tracking data identifies for the tracked user accesses.

18. The method of claim 1, wherein tracking the contexts of the tracked accesses comprises storing context information describing the contexts in which the accesses to the objects were made, including, for each of at least some of the tracked accesses, at least one of a location, task, document, or application associated with the tracked access;
- wherein the context data indicating a current context of the client device comprises at least one of a location of the client device, a task performed by the client device, a document open at the client device, or an application open at the client device; and
- wherein determining the opinion measure for the particular object comprises weighting tracked accesses based on the respective levels of similarity between the location, task, document, or application associated with the tracked access and the location, task, document, or application indicated by the current context of the client device.

* * * * *

UNITED STATES PATENT AND TRADEMARK OFFICE
CERTIFICATE OF CORRECTION

| | |
|---|---|
| PATENT NO. | : 11,625,426 B2 |
| APPLICATION NO. | : 16/450673 |
| DATED | : April 11, 2023 |
| INVENTOR(S) | : Saurabh Abhyankar, Scott Rigney and Timothy Lang |

It is certified that error appears in the above-identified patent and that said Letters Patent is hereby corrected as shown below:

In the Claims

In Claim 12, Column 24, Line 45, delete "obj ect." and insert -- object. --.

Signed and Sealed this
Eleventh Day of July, 2023

Katherine Kelly Vidal
*Director of the United States Patent and Trademark Office*